Patented Mar. 21, 1944

2,344,798

UNITED STATES PATENT OFFICE 2,344,798

MANUFACTURE OF ORGANIC ESTERS

Joseph Horsefield Brown and John Stephen Watt, Stockton-on-Tees, England, assignors to Imperial Chemical Industries Limited, a corporation of Great Britain No Drawing. Application March 16, 1939, Serial No. 262,304. In Great Britain March 16, 1938

15 Claims. (Cl. 260—486)

This invention relates to the manufacture of organic esters and more particularly to the manufacture of esters of methacrylic acid.

It is known that vinyl esters of carboxylic acids can be prepared by reacting the corresponding acid with acetylene in the presence of a mercury catalyst, e. g. mercury sulphate or mercury phosphate, and it has been proposed to prepare the mercury catalyst in situ.

This invention has as an object to devise a new method of manufacturing organic esters. A further object is to devise a new method of manufacturing esters of methacrylic acid. Further objects will appear hereinafter. These objects are accomplished by the following invention.

We have found that methacrylic acid will react with acetylene to give methacrylic esters in the presence of freshly precipitated mercuric sulphate or phosphate and free sulphuric or phosphoric acid.

Suitably, the reaction is carried out by passing the acetylene into a suspension of the mercury catalyst in methacrylic acid, containing e. g. 1% to 20% and preferably 1 to 5% of free sulphuric or phosphoric acid at ordinary or somewhat elevated temperatures, e. g. 30–50° C., or even 100° C., introduction of the acetylene being continued as long as absorption of gas occurs; preferably the acetylene is passed in more rapidly than it reacts in order to keep the catalyst in suspension by maintaining the liquid in a state of agitation, although we may also achieve this result by providing a mechanical stirrer, or by diluting the gas with an inert diluent such as nitrogen. Preferably there is present at least one per cent of the mercury catalyst.

We find that during this reaction two ester products are formed, namely, vinyl methacrylate and ethylidene dimethacrylate, and these may be obtained from the reaction mixture in any convenient manner, as by distillation under reduced pressure, after removal of the free mineral acid by precipitation as an insoluble salt. The two esters may be distilled off together and subsequently separated by fractionation, or they may be recovered separately from the reaction mixture by distilling the crude reaction product through a fractionation column.

We may also add during the reaction or the subsequent distillation an antipolymerisation catalyst known to inhibit the polymerisation of vinyl compounds. Such catalysts include sulphur, hydroquinone and tannic acid.

If desired the catalyst can be prepared in situ, e. g. by dissolving mercuric oxide in the methacrylic acid and adding excess sulphuric acid or phosphoric acid to precipitate the corresponding mercury salt; some water will, of course, be formed thereby, and we find it desirable, in order to secure the best results, to remove free water from the reaction zone, before carrying out the esterification. This may be done by adding a corresponding amount of an organic acid anhydride such as acetic anhydride or preferably methacrylic anhydride or, when the sulphate is used as catalyst, by replacing part of the sulphuric acid by oleum.

In a preferred form of our invention, however, we prepare the catalyst separately and add it to the methacrylic acid for we find that by so doing a greater rate of reaction can be achieved.

One method of preparing the catalyst in this way is to dissolve mercuric oxide in an excess of glacial acetic acid by boiling, and to precipitate mercuric sulphate by adding concentrated sulphuric acid. The precipitated material is then filtered off, washed, suitably with methacrylic acid and dried on a suction filter, after which it is ready for use. A mercuric phosphate catalyst may be prepared in a similar way.

In one form of our invention where the catalyst is prepared in situ, mercuric oxide is dissolved in about 25 times its weight of methacrylic acid, twice the amount of concentrated sulphuric acid required to precipitate the mercury as sulphate is then added and also a small amount of methacrylic anhydride, the latter to react with the water formed by the solution of the mercuric oxide, and with any present in the reactants. Acetylene is then passed in, preferably more quickly than it reacts with the methacrylic acid, until no further absorption occurs. The products are then isolated by treating with potassium methacrylate to neutralise free sulphuric acid, and distilling, preferably after filtering from the potassium sulphate-containing sludge. The process can be carried out at ordinary or at elevated temperatures, e. g. up to 100° C., suitably at 30–50° C.

The following examples illustrate but do not limit our invention, all parts being by weight.

Example 1

20 parts of mercuric oxide were dissolved in 105 parts of boiling glacial acetic acid and mercuric sulphate was precipitated by adding 18.5 parts of concentrated sulphuric acid. The product was filtered, washed with 50 parts of methacrylic acid and dried in the filter. The mercury sulphate so obtained was mixed with 500 parts of methacrylic acid, 45 parts of methacrylic anhydride and 30 parts of 100% sulphuric acid were then added, and acetylene passed in while maintaining the temperature at 30–40° C. Absorption was rapid at first, slowing down later; after 4½ hours when 117 parts had passed in absorption ceased. The catalyst was allowed to settle and the supernatant liquid was poured on to 50 parts of potassium methacrylate to convert any sulphuric acid to sulphate. After standing for some hours the liquid was filtered and distilled at reduced pressure through a fractionation column; 128 parts distilled below 76° C. at a pressure of 16 mm. Hg a further 178 parts boiled between 76 and 86° C. at 16 mm. Hg while another 58 parts distilled at the same pressure between 86–111° C. leaving 158 parts of residue in the still.

The two fractions boiling below 86° C. were mixed, washed with alkali and redistilled at atmospheric pressure when 50 parts of vinyl methacrylate were obtained boiling at 116–118° C. The other two fractions were likewise mixed, washed with alkali and distilled at a pressure of 15 mms. 90 parts of product distilled over at 100–102° C., consisting of ethylidene dimethacrylate.

The product boiling at 116–118° C. analysed as follows:

|  | C | H |
| --- | --- | --- |
|  | Per cent | Per cent |
| Found | 64.2 | 7.3 |
| Required for vinyl methacrylate | 64.3 | 7.2 | while the product boiling at 100–102° C. at 15 mms. Hg analysed thus:

|  | C | H |
| --- | --- | --- |
|  | Per cent | Per cent |
| Found | 60.1 | 7.0 |
| Required for ethylidene dimethacrylate | 60.6 | 7.1 |

*Example 2*

A mercuric sulphate catalyst was prepared as in Example 1, mixed in the same proportions with similar amounts of methacrylic acid, methacrylic anhydride and 100% sulphuric acid. Acetylene was then passed in more quickly than it was absorbed, while the temperature was gradually increased from 30° C. to 90° C. by external heating. Absorption of acetylene ceased after 3½ hours when 125 parts had been absorbed. The product was worked up as in Example 1 and fractionated under reduced pressure. The following fractions were obtained:

(1) 70 parts boiling between 28° C./70 mm. Hg and 48° C./50 mms. Hg consisting mainly of vinyl methacrylate together with about 15% methacrylic acid.

(2) 65 parts boiling between 58° C./28 mm. Hg and 75° C./28 mms. Hg consisting mainly of equal parts of methacrylic acid and vinyl methacrylate.

(3) 145 parts boiling between 79° C. and 85° C. at 28 mms. Hg and consisting chiefly of unreacted methacrylic acid.

(4) 110 parts boiling between 89° C. and 105° C. at 32 mms. Hg and consisting of 20% ethylidene dimethacrylate and 80% methacrylic acid.

Fractions 1 and 2 were mixed, washed with aqueous alkali to remove free acid and distilled to give pure vinyl methacrylate. Ethylidene dimethacrylate was similarly recovered from fraction 4.

*Example 3*

20 parts of mercuric oxide were dissolved in 105 parts of boiling glacial acetic acid, and mercuric phosphate was precipitated by adding 10 parts of phosphoric acid. The precipitate was separated by filtration, washed with 50 parts of methacrylic acid and dried on the filter. The phosphate thus obtained was suspended in 500 parts of methacrylic acid. 20 parts of phosphoric acid and 45 parts of methacrylic anhydride were then added, and acetylene passed in while maintaining the temperature at 40–50° C. Absorption ceased after 7 hours when 85 parts of acetylene had been absorbed. The mercury catalyst was allowed to settle, the liquid treated with potassium methacrylate as in Example 1, and filtered. The filtrate was distilled without fractionation when 185 parts of product were obtained boiling between 28° C./23 mms. Hg and 110° C./10 mms. Hg.

On fractionating this product the following fractions were obtained:

(1) 53 parts boiling between 20° C. and 46° C. at 23 mm. Hg and consisting of vinyl methacrylate containing some free methacrylic acid.

(2) 35 parts boiling between 50° C./18 mm. Hg and 80° C. at 9 mms. Hg consisting of 60–70% free acid, the remainder being a mixture of the two esters.

(3) 67 parts boiling between 80–100° C. at 8 mms. Hg and consisting of 87% ethylidene dimethacrylate and 13% methacrylic acid.

As many apparently widely different embodiments of this invention may be made without departing from the spirit and scope thereof, it is to be understood that the invention is not limited to the specific embodiments thereof except as defined in the appended claims.

We claim:

1. A method of manufacturing esters of methacrylic acid which comprises reacting methacrylic acid with acetylene in the presence of a mixture of the class consisting of mercuric sulphate-sulphuric acid and mercuric phosphate-phosphoric acid.

2. A method as claimed in claim 1 when carried out at a temperature between 30 and 50° C.

3. A method as claimed in claim 1 in which the free acid of the class consisting of sulphuric and phosphoric acids amounts to between 1 and 5% of the methacrylic acid present.

4. A method as claimed in claim 1 in which the acetylene is passed through a suspension of the mercury catalyst in methacrylic acid more rapidly than it reacts with the acid.

5. A method as claimed in claim 1 in which the acetylene is passed through a suspension of the mercury catalyst in methacrylic acid in admixture with an inert gas.

6. A method as claimed in claim 1 in which the mercury catalyst is formed by dissolving mercuric oxide in the methacrylic acid and adding excess of the acid of the class consisting of sulphuric and phosphoric acids.

7. A method of manufacturing esters of methacrylic acid which comprises reacting methacrylic acid with acetylene in the presence of a polymerization inhibitor, a mixture of the class consisting of mercuric sulphate-sulphuric acid and mercuric phosphate-phosphoric acid.

8. A method of manufacturing esters of methacrylic acid which comprises reacting methacrylic acid with acetylene in the presence of mercuric sulphate and free sulphuric acid.

9. A method of manufacturing esters of methacrylic acid which comprises reacting methacrylic acid with acetylene in the presence of 1 per cent to 20 per cent mercuric sulphate and 1 per cent to 5 per cent free sulphuric acid at a temperature of 30° C. to 50° C.

10. A method of manufacturing esters of methacrylic acid which comprises reacting methacrylic acid with acetylene in the presence of mercuric phosphate and free phosphoric acid.

11. A method of manufacturing esters of methacrylic acid which comprises reacting methacrylic acid with acetylene in the presence of 1 per cent to 20 per cent mercuric phosphate and 1 per cent to 5 per cent free phosphoric acid at a temperature of 30° C. to 50° C.

12. Process for making ethylidene dimethacrylate which comprises reacting acetylene with methacrylic acid in the presence of a mercuric sulphate catalyst.

13. Ethylidene dimethacrylate.

14. Process for making ethylidene dimethacrylate which comprises the steps of dissolving mercuric oxide in glacial acetic acid, treating the solution with sulphuric acid and precipitating mercuric sulphate, recovering the precipitate and adding it to methacrylic acid, treating the mixture with acetylene and distilling the product to recover the ethylidene dimethacrylate ester.

15. The process of preparing esters of methacrylic acid which comprises treating the acid with acetylene in the presence of a mercuric salt.

JOSEPH HORSEFIELD BROWN.
JOHN STEPHEN WATT.